United States Patent Office 2,699,059
Patented Jan. 11, 1955

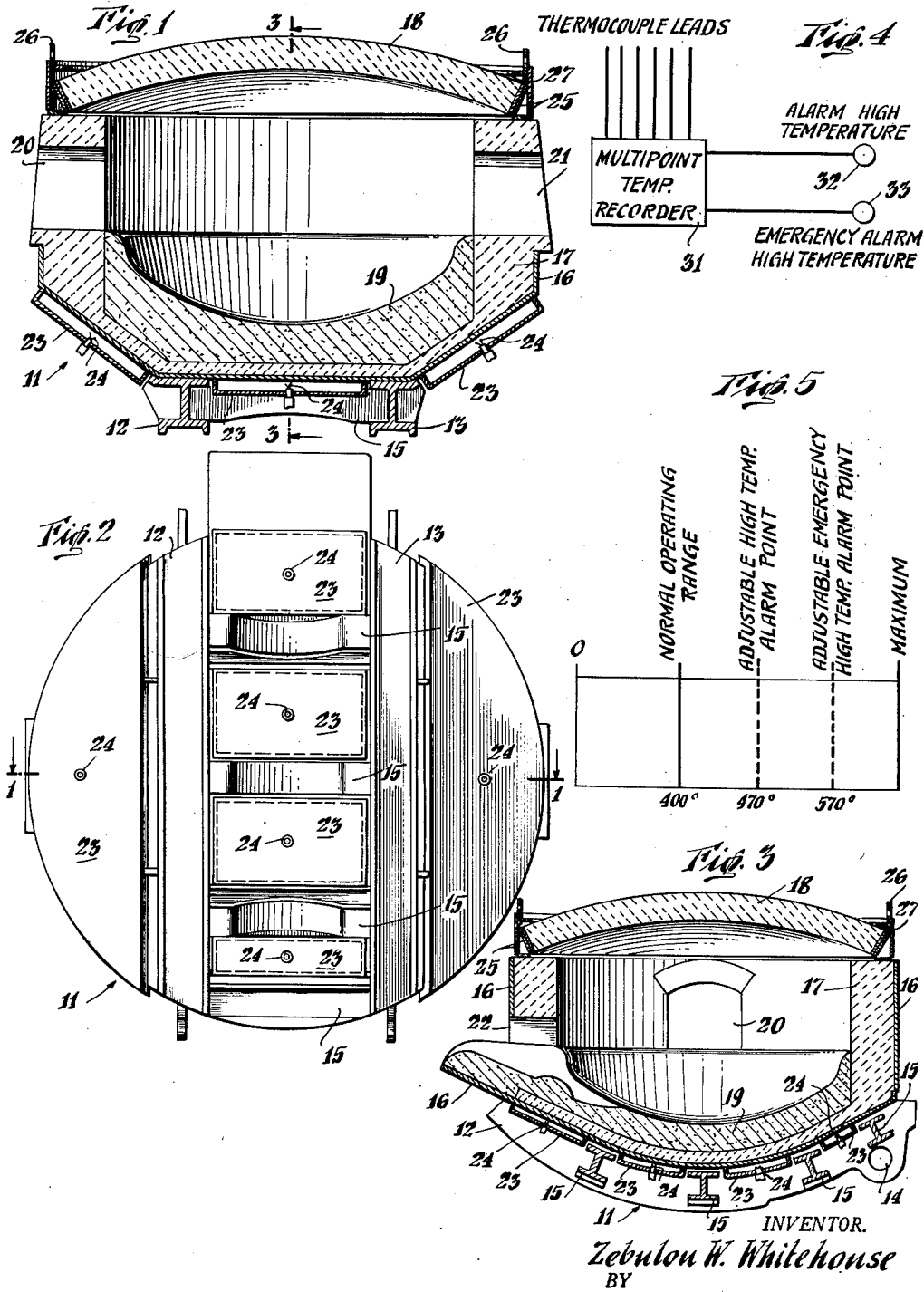

2,699,059

METHOD AND MEANS FOR DETERMINING DEFECTS IN THE BOTTOM OF FURNACES

Zebulon W. Whitehouse, Canton, Ohio, assignor to Republic Steel Corporation, Cleveland, Ohio, a corporation of New Jersey Application May 27, 1952, Serial No. 290,130

8 Claims. (Cl. 73—15)

In high temperature furnaces such as those used in steel making, it is important to keep close watch on the condition of the bottom in order to avoid a bottom failure which would release the charge being heated and cause great trouble, endangering personnel and invariably producing damage (as well as loss of metal), because of the molten charge flowing out uncontrolled. At present, the furnaces are inspected visually after each heat and any defects that can be seen are repaired before the next heat. Each heat is begun by charging the furnace with suitable material such as iron, scrap steel and charge ore, and then applying heat in the ordinary manner until the charge is ready to be poured. After the charge is completely poured, the regular inspection is made through the doors or openings, but the interior of the furnace is red hot and even if it might otherwise be possible to see any cracks and crevices in the glowing refractory bottom, they may be filled (and thus masked) with similarly glowing slag. These conditions make it difficult to be sure that any weak spots or defects are being repaired as they occur. Added to this problem is the fact that if a gradual, general erosion of the refractory material lining of the bottom is occurring, it is quite difficult to detect by means of this visual inspection.

By using the present invention, an advance indication of defects in the bottom of a high temperature furnace may be had, which is more reliable than the visual indication alone as described above, and at the same time is very simple and practical. A defect in the furnace bottom probably tends to cause a hot spot in the outer shell, out such a hot spot is so localized that it would be highly impractical if not prohibitive to try to determine the presence of defects by directly measuring the temperature of the outer shell. For example, either the measurements would be unreliable (e. g., apt to be falsely reassuring) because of the localized nature of the excessive temperature and the fact that a temperature measuring device would only measure the temperature of the bottom at the spot where it was located, or, the number of temperature measuring units would be prohibitively excessive. By using the present invention, however, all such difficulties are overcome.

An object of this invention is to provide simple, relatively inexpensive and trustworthy means for determining the occurence of defects in the bottom of a high temperature furnace, so that repairs may be made as weaknesses occur and a break through with loss of charge may be avoided.

Another object is the provision of a moderately localized indication of trouble in the bottom of a furnace, so that the difficulty may be more easily located.

For a more complete description of the invention, reference is made to the drawings, wherein:

Fig. 1 is a vertical view in cross-section through the center of an electric furnace, taken along the line 1—1 of Fig. 2, which line includes a jog to show one of the central jackets and its thermocouple;

Fig. 2 is a bottom plan view of the furnace showing its general outline;

Fig. 3 is a transverse vertical view in cross-section taken along the line 3—3 of Fig. 1;

Fig. 4 is a schematic diagram showing means for indicating high temperatures of any of the thermocouples in use; and Fig. 5 is a diagram showing the expected temperature range when using the invention on an electric furnace.

The invention is applicable to any high temperature furnace. However, the furnace presently disclosed is an electric furnace of a type used in steel making, the problems outlined above being particularly acute and the present improvements unusually appropriate and advantageous, in such furnaces. The electric furnace 11 thus selected for illustration is of a circular outline in general as shown in Fig. 2. Such a furnace is so constructed as to rest on a cradle-like support formed by a pair of heavy I-beams 12 and 13. These I-beams have an arcuate shape as seen in Fig. 3 and are provided with holes 14 accommodating pushing arms (not shown) which serve to rock the furnace 11 on its cradle-like supports 12 and 13. In this way, the furnace may be rocked on its arcuate I-beam supports 12 and 13 in order to tip the furnace for pouring the molten steel after each heat. To complete the cradle-like support, there are four short I-beams 15 connecting the two heavy I-beams 12 and 13, and reinforcing the assembly.

The furnace proper has an outer shell 16 which may be steel or some other strong metal structure which can withstand necessary conditions. An inner shell or body 17 is composed of a refractory material, since this portion of the furnace is exposed to the high temperatures inside the furnace. There is a dome-shaped roof 18 which is also made of a refractory material and which is supported on and appropriately attached to a hollow steel ring 25 which in turn rests on the upper surface of the inner shell or body 17 which body is encased in its outer shell 16 for lateral support. The hollow ring 25 is triangular in cross-section as shown in Figs. 1 and 3 and may be constructed of appropriately welded steel plates. There are four brackets 26 welded to the inside of the rim of hollow ring 25 which are used for lifting the roof of the furnace in changing roofs. There is also a horizontal flange 27 around the inside of the rim of ring 25 just above the slant side of the hollow portion of ring 25. This flange 27 adds stiffness to the ring 25 needed to withstand stresses caused in lifting the roof. The hollow portion of ring 25 is used for cooling and temperature control, by circulating water or an appropriate coolant therein. The interior of the bottom of the furnace is filled with a suitable, highly refractory material 19, it being understood that the refractory parts of the furnace may be of the composition and structure conventional in furnaces of this type. There are two side doors 20 and 21, the left-hand door 20 as seen in Fig. 1 is a charging door where the material to be heated such as scrap and charging ore may be introduced. The right-hand door 21 is a work door. There is also a spout-shaped opening 22 which is used to pour out the molten metal after the heating. It will be understood that closure means can be provided as necessary for the furnace openings e. g. including the usual doors (not shown), for the doorways 20, 21. Likewise, for simplicity, the conventional electrodes are omitted from the drawings, such electrodes being usually three in number and supported through the roof 18 to project down into the furnace cavity.

Located on the outside of the bottom shell 16 are a number of jacket-like blisters 23. These blisters are shaped to conform with the generally spherical shaped bottom of the furnace and may be made of an appropriate material. It has been found that using sheet steel to make these jackets is entirely satisfactory, and they may then be welded into place for secure fastening. Located inside the air space formed underneath each of the blisters 23 and very preferably spaced from the furnace shell 16 is a thermocouple 24 for measuring the temperature of the air inside each blister. Each thermocouple is conveniently mounted through and carried by the blister shell, for example at about the center of the latter. Any appropriate temperature measuring device might be used in place of a thermocouple, if desired. The laterally positioned location of each thermocouple within its blister has been found not to be critical, since the temperature of the air throughout the space under each jacket only varies an inconsequential amount, i. e. from place to place across such space. It will be noted that on the furnace illustrated it is found convenient to locate six jackets or blisters 23 in order to completely cover the exposed outer shell 16 of the bottom of the furnace. The particular jackets illustrated have been constructed so that they leave an air space of about 3" measured perpendicular to the outer shell 16. However, it will be quite apparent that any convenient air space which is sufficient to allow circulation of the air within each blister would be satisfactory so long as it is not so deep as to provide an undesirably high cooling effect, through the blister wall, on the contained air.

It will be obvious to one skilled in the art that some fluid, e. g. an inert fluid, other than air might be used within the cavities formed under the jackets 23, if there were some reason which would warrant such use of other fluid.

One of the chief merits of this invention lies in its simplicity and in the fact that a reliable, inexpensive method of determining weaknesses in the bottom of a furnace is provided, whereby no undetected weakness will be allowed to grow until a burn-out of the furnace occurs. That is to say, it has been found that the temperature in a jacket or blister of the character here provided is quite accurately indicative of the character of the furnace bottom, i. e. of the state of repair of the refractory lining throughout the region adjacent the blister. Extensive tests have shown that throughout successive heats of the furnace, the observed jacket cavity temperature will remain within a predetermined range so long as there are no serious faults, dangerous thin spots, or the like in the lining or wall; as defects develop, even though far more localized than the entire extent of a blister or even though localized at only a single spot, the blister thermocouple temperature will rise and will ultimately, as the defect becomes very dangerous, reach a value expressly significant of the hazard and thus of the urgent need for repair.

Stated more generally, it is found to be a very simple matter (for example as indicated in Fig. 5 for one standard type of electric steel furnace) to correlate the temperature readings of the thermocouples with the condition of the furnace bottom and thus to predetermine successively higher temperature limits which respectively represent, say, conditions of safe operation, of need for ordinary repair, and of unusually dangerous defects. Indeed such correlation is immediately observable, for example, by comparison of temperature readings at times when the furnace is operating normally and times when need for minor repairs is visually noted (a definite and substantially higher temperature being then detected when the furnace is in operation); and further or danger points in the calibration curve can be obtained by other or similar observations as well as by extrapolation.

An explanation of the way in which the measurement of the temperature at any convenient location under each blister is effective for the whole area under the blister is apparently that convection currents in the cavity formed under the blister serve quickly to heat the whole volume of fluid in the cavity. Therefore, when a defect or weakness has developed in the furnace bottom, it will cause a hot spot to form on the outer shell. This hot spot may be extremely localized, or it may be of greater area by reason of some general thinning of the refractory lining. In either case, by providing jackets or blisters, the effect will be to heat up the fluid contained in the cavity under these blisters or one of them, and the desired indication will be had.

It will now be clear that while it might be obvious to measure the temperature of the outer shell by contact temperature measuring devices (e. g. devices seated against or embedded in the shell for response to its own temperature), means of that character would entail such close spacing of the temperature measuring devices to be sure of noting any defect, that it is not at all practical to use any such means for determining weaknesses in the bottom of a furnace. In contrast, the present arrangement requires at most only a relatively small number of thermocouples or the like. Indeed in some cases, especially with a small furnace, significant results are attainable by using only a single, continuous blister or jacket extending across the entire bottom or a critical portion of the bottom, with a corresponding single device for detecting the temperature in the blister cavity; however, it appears specially advantageous and is thus a specific feature of improvement, to provide a small plurality of blisters (e. g. at least several but often not more than a total of six or eight) which distributively cover the bottom and which afford corresponding indication of the particular region or regions where repairs may be needed at a given time.

It has been found in practice that with one well-known form of electric furnace such as the type illustrated, the normal operating temperature range of the air within the cavities under blisters 23 is about 400° F. as illustrated in Fig. 5. Fig. 5 also illustrates the high temperatures which would indicate some difficulties or other defects tending to indicate a dangerous condition of the bottom of the furnace. For instance, when the temperature in a blister on this particular furnace reaches about 470° F. it appears certain that some bottom repair is needed, and if the temperature rises much further the urgency may be considered to be greater, reaching a critically dangerous point at a selected high temperature, say 570° F., it being understood that these points to be used for special significance to operating personnel are selected, in any case, by suitable calibration as explained above.

Fig. 4 illustrates schematically the use of conventional means such as a multipoint temperature recorder 31 to indicate whenever one or more of the thermocouples 24 is indicating a high temperature. Some type of alarm device 32 may be used to give a visual or oral indication of the first high temperature point. There may be a further indicating means 33 which is set to give an indication of emergency high temperatures at one or more of the thermocouples. In this way, effective means are provided for giving an advance indication of dangerous conditions located in the bottom of the furnace.

It will be obvious that this invention is not limited in use to an electric furnace as illustrated, but may be applied to many other types of furnaces, e. g. an open hearth furnace or a furnace for other than steel making. Therefore I do not wish to be limited by the embodiment illustrated, it being understood that the invention may be carried out in other ways or forms without departure from its spirit.

I claim:

1. In the operation of a high temperature furnace, the method of determining weaknesses in the bottom before failure occurs which consists of steps of enclosing a volume of fluid in a blister-like space over an extended area of the outside of the furnace bottom and measuring the temperature of the fluid within said space.

2. In the operation of a high temperature furnace the method of determining likelihood of failure of the bottom before such failure occurs consisting of the steps of confining air adjacent the bottom of the furnace within a jacket-like space over an extended area of the outside of the furnace bottom, and measuring the temperature of the air in said space, said measured temperature being an indication of likelihood of failure.

3. In combination with a furnace having a refractory-lined metal-encased bottom, apparatus for detecting defects in a predetermined region of said bottom, comprising a shell secured to said bottom over said region and providing an enclosed cavity jacketing said region, said cavity being filled with fluid, and temperature measuring means having a temperature sensitive element mounted in said cavity for detecting the temperature of the fluid in said cavity.

4. In combination with a furnace having a refractory-lined metal-encased bottom, apparatus for detecting defects in a predetermined region of said bottom, comprising a shell secured to said bottom over said region and providing an enclosed air cavity jacketing said region, and temperature measuring means having a temperature sensitive element mounted in said cavity for detecting the temperature of the air in said cavity.

5. In combination with a furnace having a refractory-lined metal-encased bottom, apparatus for detecting defects in a predetermined region of said bottom, comprising a shell secured to said bottom over said region and providing an enclosed cavity jacketing said region, an inert fluid filling said cavity, and temperature measuring means having a temperature sensitive element mounted in said cavity for detecting the temperature of said fluid.

6. In combination with a furnace having a refractory-lined metal-encased bottom, apparatus for detecting defects in a predetermined region of said bottom, comprising a shell secured to said bottom over said region and providing an enclosed air cavity jacketing said region, and temperature measuring means having a temperature sensitive element mounted in said cavity and spaced therein from said bottom for detecting the temperature of the air in said cavity.

7. In combination with a furnace having a refractory-lined metal-encased bottom, apparatus for detecting defects in predetermined regions of said bottom, comprising a plurality of shells secured to said bottom over said predetermined regions and providing enclosed cavities jacketing said regions, said cavities being filled with fluid, and temperature measuring means having temperature sensitive elements respectively mounted in each of said cavities for detecting the respective temperatures in said cavities.

8. In combination with a furnace having a bottom comprising a body of refractory material, apparatus for detecting defects in said bottom, comprising shell means secured to said bottom and providing an enclosed, bottom-jacketing cavity, said cavity being filled with fluid, and temperature measuring means having a temperature sensitive element to the fluid associated with said shell means for detecting the temperature imparted in said cavity by the furnace bottom.

References Cited in the file of this patent
UNITED STATES PATENTS

| | | |
|---|---|---|
| 934,733 | Jorgenson | Sept. 21, 1909 |
| 1,561,659 | Nichols | Nov. 17, 1925 |
| 2,022,440 | Slough | Nov. 26, 1935 |